(12) United States Patent
Hu

(10) Patent No.: US 7,447,212 B2
(45) Date of Patent: Nov. 4, 2008

(54) METHOD AND SYSTEM FOR AUTOMATING MEMBERSHIP DISCOVERY IN A DISTRIBUTED COMPUTER NETWORK

(75) Inventor: Cheng-Hong Hu, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1105 days.

(21) Appl. No.: 10/654,645

(22) Filed: Sep. 3, 2003

(65) Prior Publication Data
US 2006/0080421 A1 Apr. 13, 2006

(51) Int. Cl.
*H04L 12/28* (2006.01)
(52) U.S. Cl. .................... 370/395.3; 370/395.5
(58) Field of Classification Search .......... 370/393, 370/395.53, 392, 395.1, 389–390, 236
See application file for complete search history.

(56) References Cited

U.S. PATENT DOCUMENTS

| | | | |
|---|---|---|---|
| 6,493,349 | B1 | 12/2002 | Casey |
| 7,260,097 | B2 * | 8/2007 | Casey .................... 370/392 |
| 2002/0080794 | A1 * | 6/2002 | Reeves et al. ............ 370/395.2 |
| 2002/0186433 | A1 * | 12/2002 | Mishra .................. 359/128 |
| 2003/0142674 | A1 * | 7/2003 | Casey .................... 370/393 |
| 2003/0167348 | A1 * | 9/2003 | Greenblat ............... 709/251 |
| 2003/0174706 | A1 * | 9/2003 | Shankar et al. ............ 370/393 |
| 2004/0037296 | A1 * | 2/2004 | Kim et al. ............. 370/395.53 |
| 2004/0085997 | A1 * | 5/2004 | Mancour ................. 370/466 |
| 2004/0088389 | A1 * | 5/2004 | Shah .................... 709/221 |
| 2004/0151120 | A1 * | 8/2004 | Shankar et al. ............ 370/249 |
| 2004/0151180 | A1 * | 8/2004 | Hu et al. ................. 370/392 |
| 2004/0153570 | A1 * | 8/2004 | Shobatake .............. 709/238 |
| 2004/0165600 | A1 * | 8/2004 | Lee .................... 370/395.53 |
| 2004/0174887 | A1 * | 9/2004 | Lee .................... 370/395.53 |
| 2004/0184407 | A1 * | 9/2004 | Pok et al. ................ 370/236 |
| 2004/0258069 | A1 * | 12/2004 | Serbest et al. ............ 370/395.1 |
| 2004/0264389 | A1 * | 12/2004 | Abdo et al. .............. 370/255 |

(Continued)

FOREIGN PATENT DOCUMENTS

EP 1351450 A2 * 10/2003

(Continued)

OTHER PUBLICATIONS

Sajassi (VPLS Architectures draft-sajassi-vpls-architectures-00.txt, Mar. 21, 2002).*

(Continued)

*Primary Examiner*—Edan Orgad
*Assistant Examiner*—Salman Ahmed
(74) *Attorney, Agent, or Firm*—Toler Law Group

(57) ABSTRACT

A system and methods for automating membership discovery in a distributed computer network is presented. A first virtual circuit label switch path (LSP) associated with a first VPLS is established between a first multi tenant unit (MTU) and an attached provider edge (PE) device. A first label mapping message (LMM) is communicated over the first virtual circuit LSP and received at the PE device. The PE device broadcasts the LMM to a plurality of additional PE devices. In addition, methods for automating membership discovery for adding and deleting virtual private LAN service (VPLS) sites are presented. A virtual circuit forwarding equivalence class (VC-FEC) type packet utilized in the various methods and system is also disclosed.

19 Claims, 9 Drawing Sheets

U.S. PATENT DOCUMENTS

| | | | |
|---|---|---|---|
| 2005/0018605 A1* | 1/2005 | Foote et al. | 370/230 |
| 2005/0027782 A1* | 2/2005 | Jalan et al. | 709/200 |
| 2005/0044262 A1* | 2/2005 | Luo | 709/238 |
| 2005/0089047 A1* | 4/2005 | Ould-Brahim et al. | 370/395.53 |
| 2005/0147104 A1* | 7/2005 | Ould-Brahim | 370/395.5 |
| 2005/0169270 A1* | 8/2005 | Mutou et al. | 370/390 |
| 2006/0041682 A1* | 2/2006 | Johnson et al. | 709/242 |
| 2006/0062218 A1* | 3/2006 | Sasagawa | 370/389 |
| 2006/0182122 A1* | 8/2006 | Davie et al. | 370/395.53 |
| 2006/0291447 A1* | 12/2006 | Siliquini et al. | 370/352 |
| 2007/0019676 A1* | 1/2007 | Kompella | 370/468 |
| 2007/0206492 A1* | 9/2007 | Zelig et al. | 370/218 |
| 2007/0263634 A1* | 11/2007 | Reeves et al. | 370/395.2 |
| 2008/0043740 A1* | 2/2008 | Doverspike et al. | 370/392 |

FOREIGN PATENT DOCUMENTS

| | | | |
|---|---|---|---|
| EP | 1619833 A1 * | 1/2006 | |

OTHER PUBLICATIONS

Sajassi et al. (VPLS Architectures draft-sajassi-vpls-architectures-00.txt, Feb. 20, 2002).*

Network based IP VPN Architecture using Virtual Routers; draft-ietf-l3vpn-vpn-vr-02.txt, Apr. 2004.*

Capuano, Mike; "VPLS: Scalable Transparent LAN Services"; Mar. 2003; Juniper Networks, Inc.

Andersson, L. et al.; "LDP Specification"; RFC 3036; Jan. 2001; The Internet Society.

Raszuk, Robert; "VPLS/TLS/DTLS/VPSN . . . "; ftp://ftp-eng.cisco.com/rraszuk/vpls; Jul. 12, 2002.

Chen, Michael et al.; "Decoupled/Hierarchical VPLS: Commonalities and Differences"; Provider Provisioned VPN WG; Internet Draft; draft-che-ppvpn-compare-00.txt; Mar. 2002.

Stokes, Olen et al.; "Testing Hierarchical Virtual Private LAN Services"; Provider Provisioned VPN WG; Internet Draft Document; draft-stokes-vkompella-ppvpn-hvpls-oam-01.txt; Dec. 2002.

Lasserre, Marc et al.; "Virtual Private LAN Services over MPLS"; Provider Provisioned VPN Working Group; Internet Draft Document; draft-lasserre-vkompella-ppvpn-vpls-02.txt; Jun. 2002.

Kompella, K. et al.; "Virtual Private LAN Service"; Network Working Group; Internet Draft; draft-kompella-ppvpn-vpls-01.txt; May 2003.

* cited by examiner

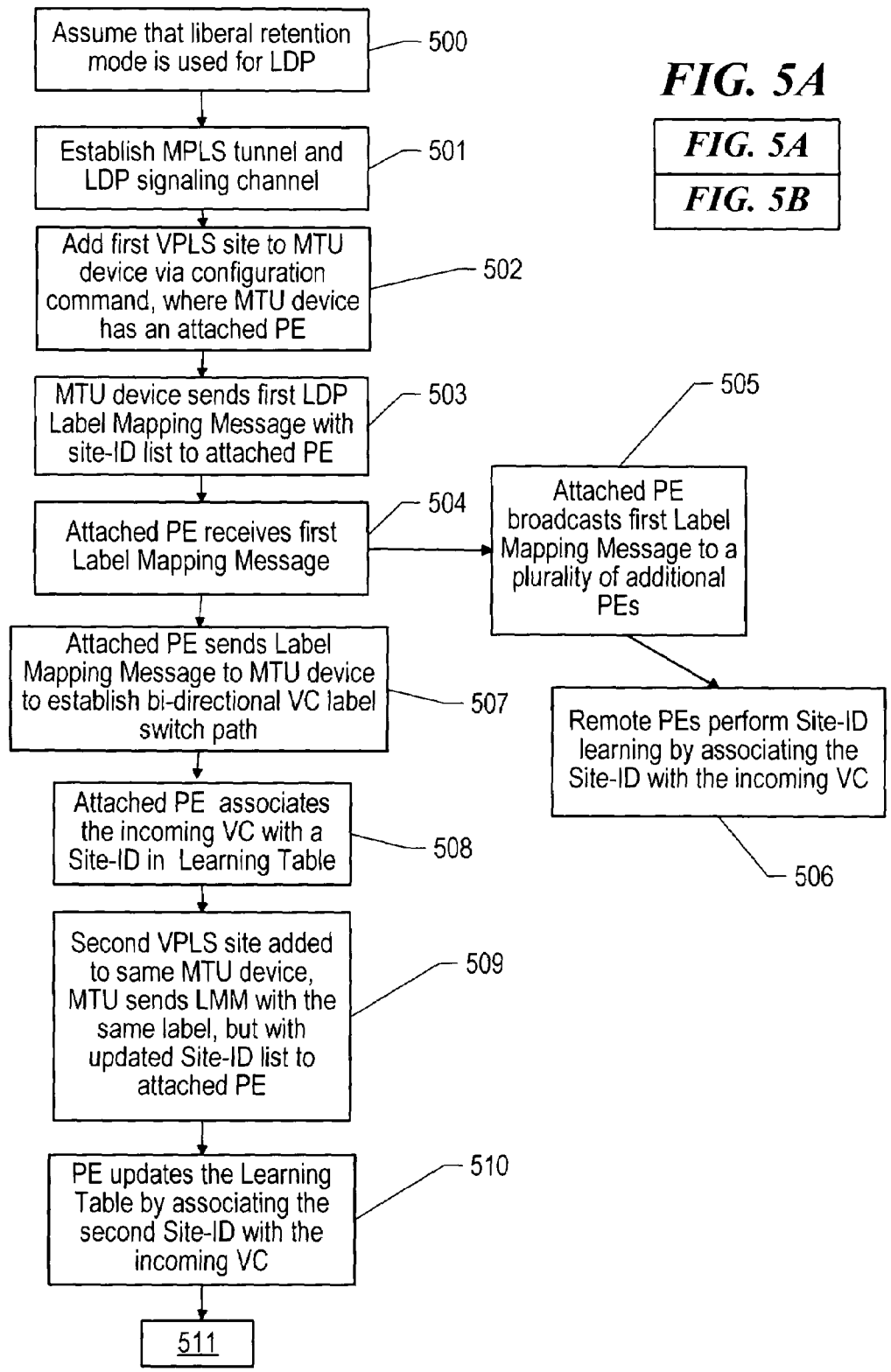

METHOD AND SYSTEM FOR AUTOMATING MEMBERSHIP DISCOVERY IN A DISTRIBUTED COMPUTER NETWORK

BACKGROUND

1. Field of the Invention

The present disclosure relates generally to distributed computer networks, and to the automation of membership discovery in a distributed computer network.

2. Description of the Related Art

A virtual provider local area network (LAN) service, also known as a VPLS, is a class of virtual provider networks (VPNs) that allow multiple customer sites to be connected where the sites appear to be on the same LAN (distributed network). VPLS service is typically offered over a provider managed Internet protocol/multi label switching (IP/MPLS) infrastructure. A VPLS could have up to a few hundred, or even thousands of sites across the entire distributed network.

Based upon the VPLS architecture model described in Internet Engineering Task Force (IETF) documents, the following manual provisioning steps may need to be repeated when adding, deleting, or modifying a customer site: 1) Add, delete, or modify a customer site to an attached multi tenant unit (MTU); 2) Add, delete, or modify a MPLS VC (multi-protocol switch path virtual circuit) between the MTU and its attached physical edge (PE) device; and, 3) Add, delete or modify a MPLS VC between a pair of PEs that are associated with the VPLS.

Manually configuring a large quantity of VPLS service sites requires significant coordination efforts for site-to-site connectivity provisioning. Due to the nature of the provisioning complexity, manual steps often cause mistakes and troubleshooting difficulties, and slow down the overall service provisioning process.

Accordingly, a need exists for an improved method and system for provisioning of distributed computer networks.

BRIEF DESCRIPTION OF THE DRAWINGS

The use of the same reference symbols in different drawings indicates similar or identical items.

DESCRIPTION OF THE PREFERRED EMBODIMENT(S)

Figure 1:
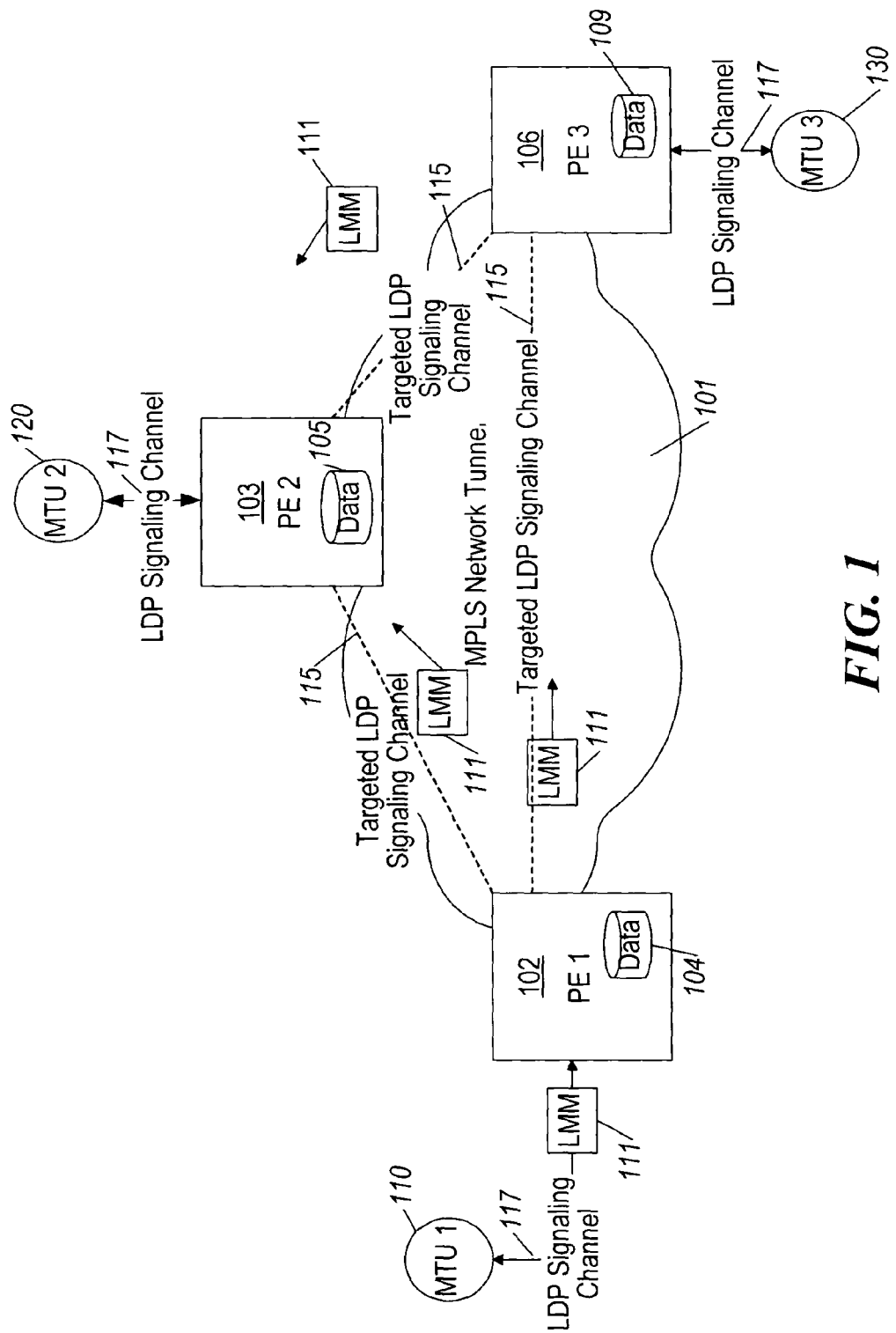
FIG. 1 is a simplified block diagram illustrating a Virtual Private LAN Service over MPLS (a distributed computer network)

The present disclosure is generally directed to automating discovery of device membership in a virtual private local area network service (VPLS) site over a distributed computer network. In a particular embodiment, a method is presented for automating membership discovery in a distributed network such as a virtual provider local area net service (VPLS). The method includes establishing a first virtual circuit label switch path (VC LSP) between a first multi tenant unit (MTU) device and a provider edge (PE) device attached to the MTU, the VC LSP being associated with a first virtual private local area network service (VPLS) site. A first label mapping message (LMM) communicated by the MTU is received at the PE device, and the PE attached PE device sends a second LMM to the MTU device. The second LMM serves to establish a bi-directional virtual circuit (VC) label switch path (LSP). The attached PE then broadcasts the first LMM to a plurality of additional PE devices.

In another embodiment, a second virtual private LAN service site is added to the distributed computer network. The second virtual private LAN service site is attached to the first multi tenant unit device. A second LMM, with a first virtual circuit (VC) label associated with the first VC LSP and a non-updated site identification (ID) list, is broadcast to the plurality of additional PE devices.

In an embodiment, a first virtual circuit label switch path (VC LSP) is established between a first multi tenant unit (MTU) device and a provider edge (PE) device attached to the MTU. The VC LSP is associated with a first virtual private local area network service (VPLS) site. A first label mapping message (LMM) communicated over the first VCLSP is received at the PE device, and the first LMM is broadcast by the PE device to a plurality of additional PE devices. In a particular embodiment, the first label mapping message has an identical virtual circuit label and an updated site identification (site ID) list with respect to a second label mapping message.

In a further embodiment, a virtual circuit forward equivalence class (VC-FEC) packet to automate membership discovery in connection with a service provider distributed network is presented. The VC-FEC packet includes a first field to identify a VC encapsulation type, a second field to identify a group identification element, a third field to identify a VC connection, an interface parameter field to define a MTU device parameter, and a sub-tag length value field specifying a particular site identifier associated with an origination site of the virtual circuit forwarding equivalence class packet.

In another embodiment, a multi-protocol label switching (MPLS) system is disclosed. The system comprises a first computing node and a second computing node coupled to the first computing node. The second computing node receives and stores a VC-FEC packet for use in automatic membership discovery.

In a particular embodiment, a method is presented for automating membership discovery in a distributed network such as a virtual provider local area net service (VPLS) network. The method includes establishing a first virtual circuit label switch path (VC LSP) between a first multi tenant unit (MTU) device and a provider edge (PE) device, e.g., a router, attached to the MTU, and establishing a VC LSP between a local PE and a remote PE. Multi-protocol switch path virtual circuit (MPLS VC) connectivity among customer sites is automatically established across a provider's network using Label Mapping Messages (LMMs), as defined in Internet Engineering Task Force (IETF) document Label Distribution Protocol (LDP) Specification RFC 3036, and LDP message relay mechanisms described herein. A PE device performs address learning when a customer packet is received for the first time on the PE device. In response to the discovery process and address learning, a site identification (ID) table, e.g., an address table, is created/updated at the PE device. Then, customer packet forwarding follows the proper VC LSP, based upon a lookup to the address learning table at the PE device.

In a particular embodiment, another method is presented for automating membership discovery in a distributed network such as a virtual provider local area net service (VPLS). The method includes establishing a virtual circuit label switch path (VC LSP) between a multi tenant unit (MTU) device and a provider edge (PE) device attached to the MTU, and establishing a VC LSP between a local PE and a remote PE. The method also includes populating an address-learning (site ID-learning) table along with membership discovery. MPLS VC connectivity among customer sites and address learning is automatically established across the provider's network using modified Label Mapping Messages with a virtual circuit forward equivalence class (FEC) and label distribution protocol (LDP) message relay mechanisms described herein. Following the discovery and address learning processes, customer packet forwarding to the proper VC LSP occurs, based on the result of an address (site ID) table lookup at the PE device.

FIG. 1 illustrates, in simplified block diagram form, an embodiment of a distributed computer network. The distributed computer network shown in the example of FIG. 1 presents three multi-tenant units (MTUs) and their associated provider edge (PE) devices; however, it will be appreciated that many more MTUs and PE devices could be provisioned and deployed.

The distributed computer network encompasses MTU devices MTU1 110, MTU2 120, and MTU3 130, and their respective attached PE devices, which are PE1 102, PE2 103, and PE3 106. In the example of FIG. 1, the MTUs are not situated in the same geographic location, that is, they are associated with different sites. Each provider edge device maintains its own local database, thus PE1 102 has a local database 104, PE2 103 has a local database 105, and PE3 106 has its local database 109.

In FIG. 1, a multi-protocol label switching (MPLS) network tunnel 101 linked switch paths (LSPs) are established between PEs. In addition, targeted label data path (LDP) sessions are set up between PE devices 102, 103, and 106. These targeted LDP sessions are indicated by the lines between PE devices 102, 103, and 106, the lines being labeled Targeted LDP Signaling Channel. The targeted LDP sessions are set up in liberal label retention mode. Label Data Path (LDP) signaling channel sessions are set up between MTU1 110 and its attached PE1 102, between MTU2 120 and its attached PE2 103, and between MTU3 130 and its attached PE3 106 device. These channel sessions are indicated by the lines 117 between MTUs and their respective PE devices, labeled LDP Signaling Channel in FIG. 1.

In the example of FIG. 1, a label mapping message (LMM) 111 is sent to PE1 device 102, and subsequently broadcast by PE1 device 102 to its peering PE devices 103 and 106. The information contained in LMM 111 is received and stored in each of the databases 104, 105, and 109. The LMM 111 is broadcast over a TCP (Transport Control Protocol) session between PEs.

Figure 2:
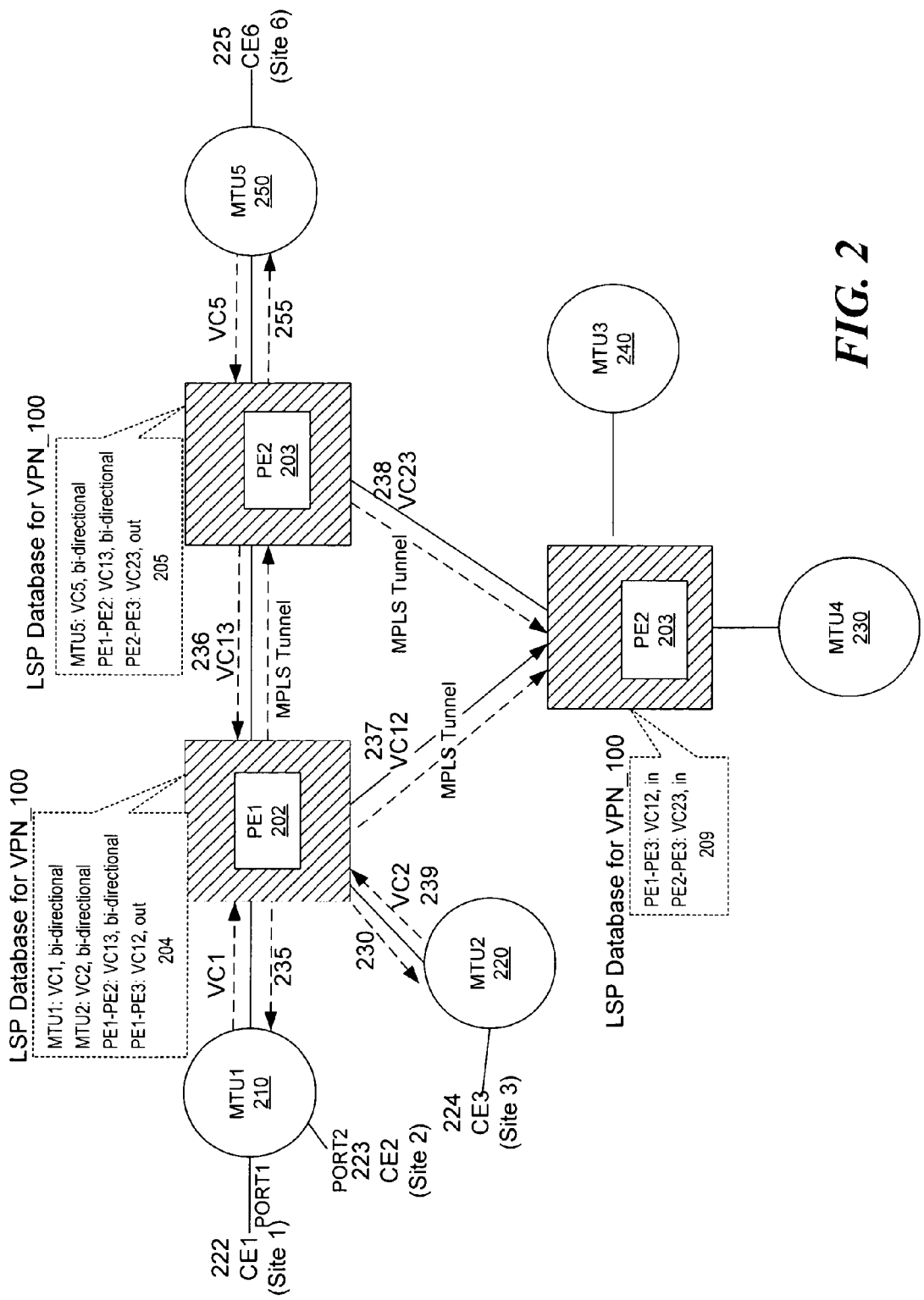
FIG. 2 is a block diagram illustrating a method for VPLS membership discovery between an MTU and its corresponding (provider edge) PE, as well as between local and remote PEs.

FIG. 2 is a block diagram illustrating VPLS membership discovery multi tenant units (MTUs) and their respective provider edge (PE) devices. The system illustrated in FIG. 2 contains a number of sites, denoted by customer equipment CE1 222, CE2 223, CE3 224, and CE6 225. As before, the particular number of sites, MTUs, and PEs are presented for illustration and are typically of greater number than shown. In the example of FIG. 2, a virtual label switch path 255 is established between PE2 203 and MTU5 250 at site CE6 225. Virtual label switch paths 235 and 239 are established between MTU1 210 and PE 202, and MTU2 220 and PE1 101. In addition, virtual label switch paths 236, 237, and 238 are established over MPLS tunnel LSPs between PE devices 202, 203, and 206.

In a particular embodiment, a first virtual label switch path such as 235 is established between a first multi-tenant unit 210 and its respective attached provider edge device 202. The virtual label switch path 235 is associated with a first virtual private local area network service (VPLS) site, such as site 222. A first label mapping message (LMM, not shown) is configured at MTU1 210, and the first LMM is communicated over a TCP session to PE device 202. PE device 202 receives the LMM, and broadcasts the first LMM to the other PE devices 203 and 206 over TCP sessions between PEs.

The information regarding the paths and devices for the established VC sessions is contained in the first LMM, and this information is stored in the respective local databases. An example of this information is shown in the database captions numbered 204, 205, and 209.

Figure 3:
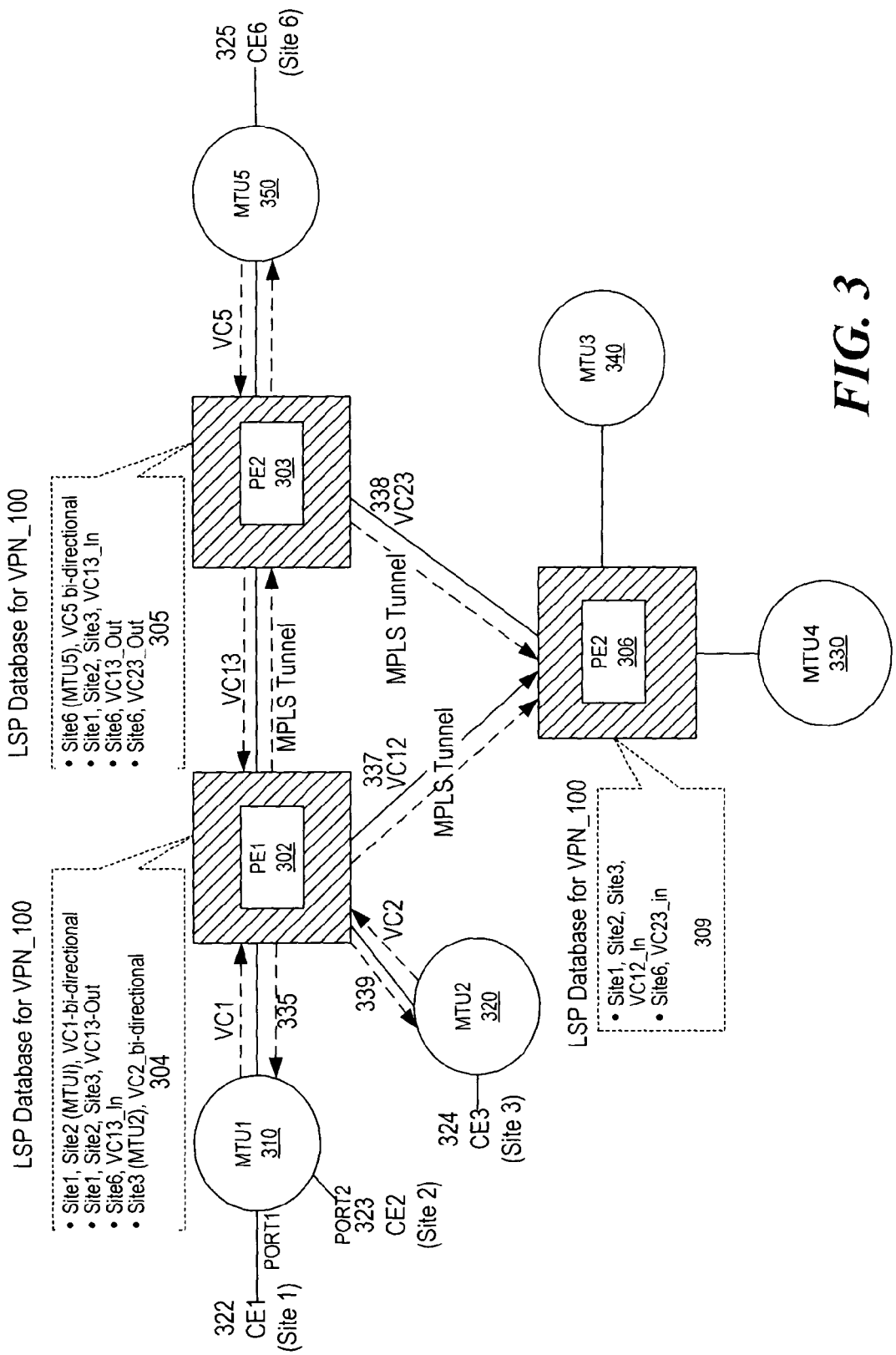
FIG. 3 is a block diagram illustrating another method for VPLS membership discovery between an MTU and its corresponding (provider edge) PE, as well as between local PE and remote PEs.

If it is desired to add another VLPS site such as site CE3 324 in FIG. 3, a second LMM with a virtual circuit label switch path such as 339, associated with the first virtual circuit label switch path 335 is configured at MTU2 320. MTU2 320 communicates the second LMM to PE device 302. The second LMM contains an updated site identification list for the addition of CE2 323 VPLS, and the second LMM is broadcast to the plurality of additional PE devices 303 and 306 by PE device 302.

Upon receipt, the information contained in the second LMM is stored in each PE device's respective database. An example of the information contained in the second LMM and stored in the respective PE devices' local databases 304, 305, and 309 is shown in the captions of FIG. 3.

Figures 4A, 4B:
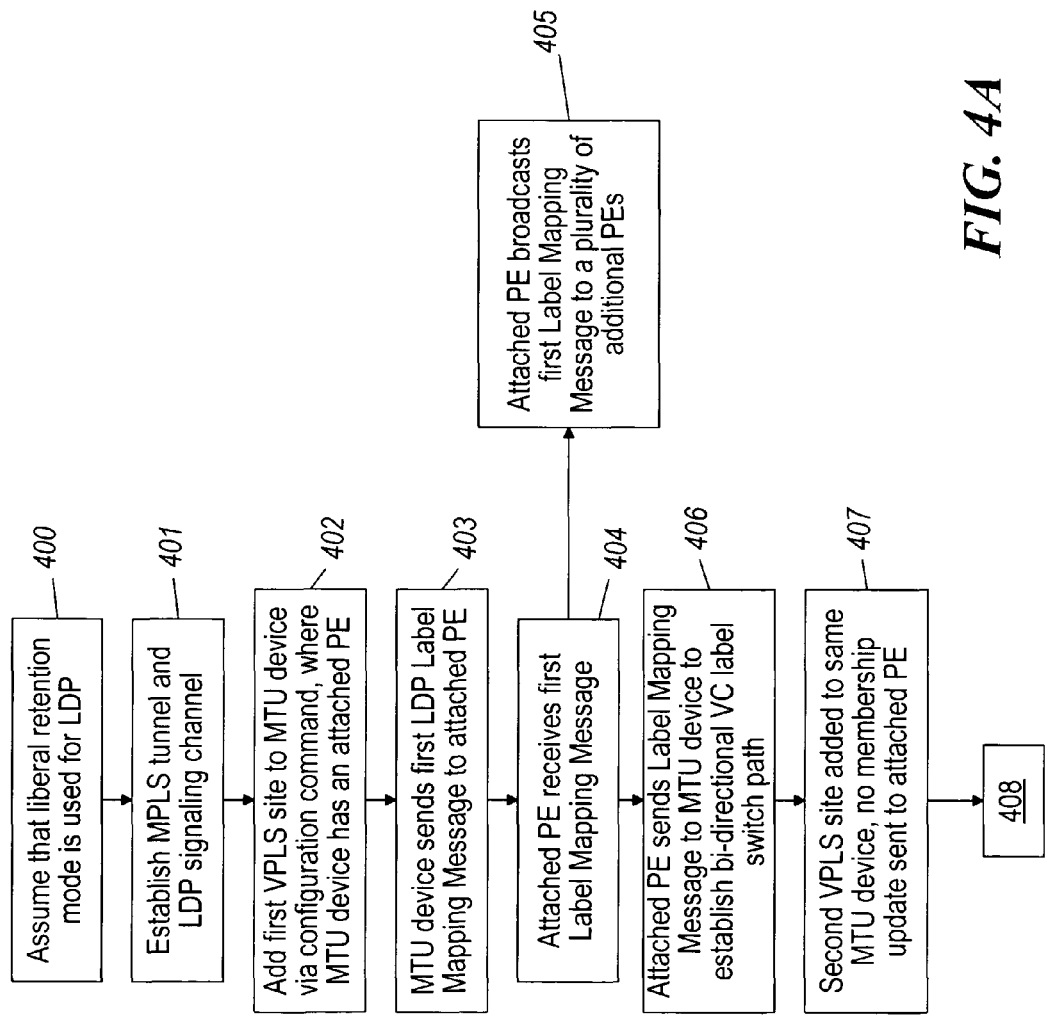
FIG. 4 is a flow diagram illustrating a method for automating VPLS membership discovery and MAC/site-ID learning in a distributed computer network.
Figure 4B:
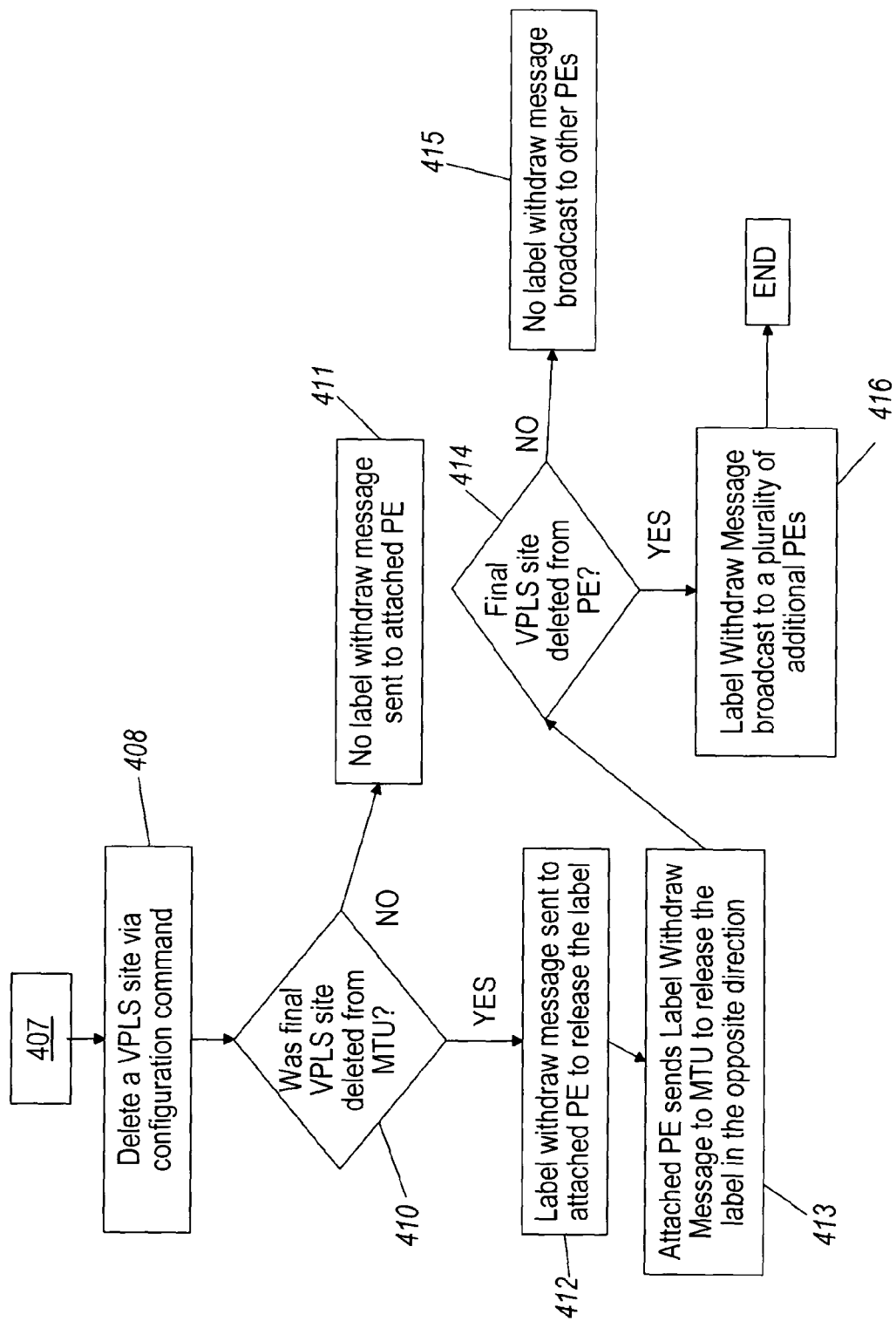

FIG. 4 is a flow diagram illustrating a method for automating VPLS membership discovery and address learning in a distributed computer network. As indicated in the topmost block 400, it is assumed that a liberal label retention mode is used for the label data paths (LDPs) between provider edge (PE) devices. In step 401, an MPLS tunnel and label data path (LDP) signaling channel are established. In step 402, a first VPLS site is added via a MTU device configuration command. The MTU device has an attached PE device. In step 403, the MTU device sends a first LDP label mapping message (LMM) to the attached PE. In step 404, the attached PE receives the first LMM and, in step 405, broadcasts the first LMM to a plurality of additional PEs.

In step 406, the attached PE sends a label mapping message to the MTU device to establish a bi-directional virtual circuit (VC) label switch path. In step 407, a second VPLS is added to the same MTU device, thus no membership update is sent to the attached PE. Should another VPLS be added to a different MTU, an LMM updating membership would be generated, communicated, and stored by the local databases associated with the peering PEs.

In step 408, a VPLS site is deleted via an MTU configuration command. In step 410, a decision as to whether this deletion is a final VPLS site deletion from the MTU is made.

If it is determined that this is the final MTU VPLS deletion, then in step 412, the MTU associated with the deleted VPLS site sends a Label Withdraw Message to its attached PE device to release the label. In step 413, the attached PE sends a Label Withdraw Message to the MTU to release the label in the opposite direction.

If it is determined in step 410 that the VPLS deletion is not the final deletion from an MTU, then in step 411, no Label Withdraw Message is sent to the attached PE device. In step 414, a decision is made as to whether a final VPLS site has been deleted from the PE device. If the determination is 'Yes,' then in step 416, a Label Withdraw Message is broadcast to a plurality of additional PE devices (peers). If the determination in step 414 is no, then no Label Withdraw Message is broadcast to the plurality of other PE devices, as in step 415.

Figure 5B:
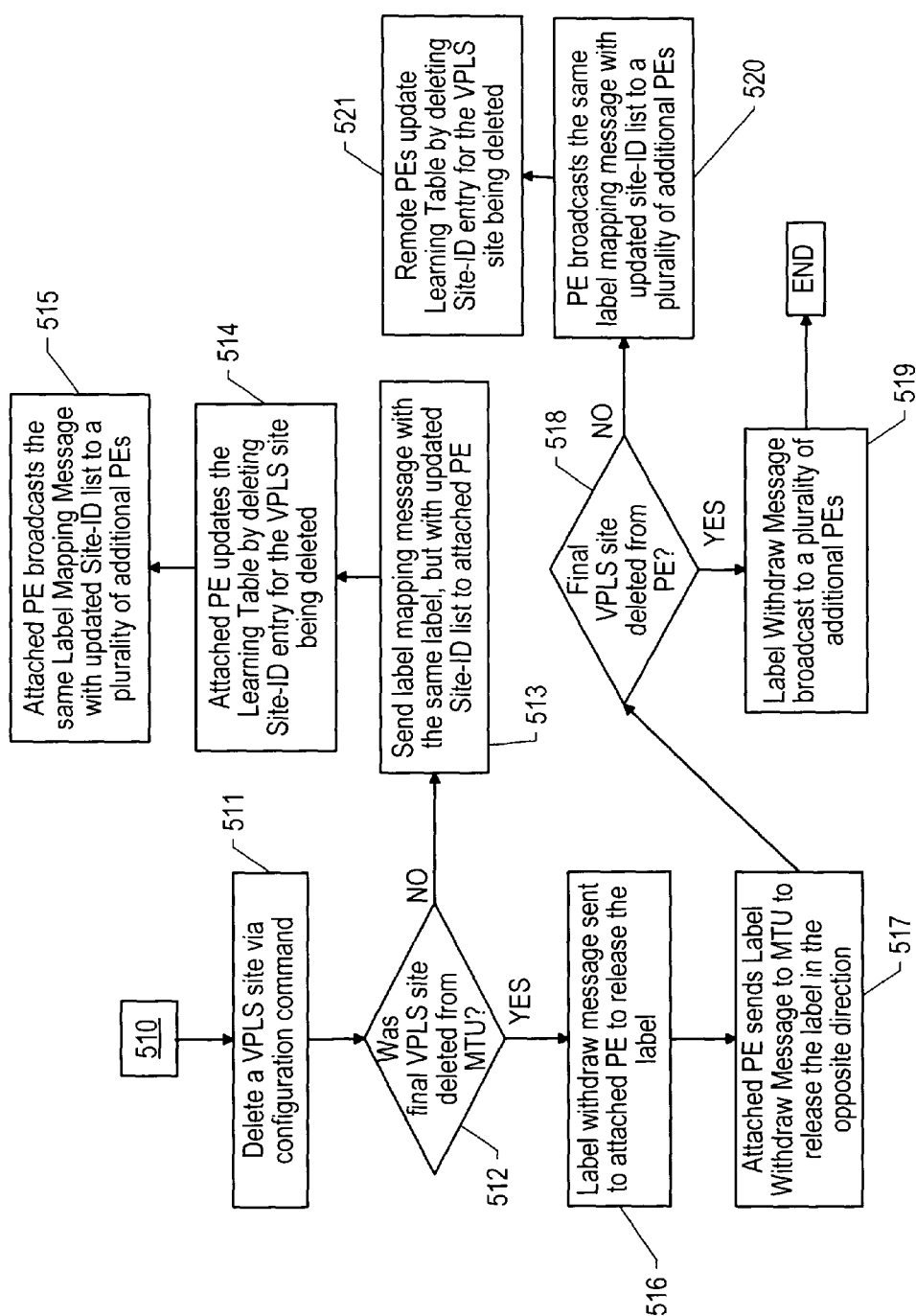
FIG. 5 is a flow diagram illustrating another method for automating VPLS membership discovery and site-ID learning.

FIG. 5 is a flow diagram illustrating another method for the automatic discovery of VPLS sites and address learning. As indicated in the topmost block 500, it is assumed that liberal label retention mode is used for the label distribution paths (LDP) between provider edge (PE) devices. In step 501, a MPLS tunnel and LDP signaling channel are established. In step 502, a first VPLS site is added via a MTU device configuration command. The MTU device has an attached PE device. In step 503, the MTU device sends a first LDP label mapping message (LMM) with a site identification (site-ID) list to the attached PE. In step 504, the attached PE receives the first LMM and, in step 505, broadcasts the first LMM to a plurality of additional remote PE devices. In step 506, the remote PE devices perform site-ID learning by associating the site-ID with the incoming virtual circuit (VC).

In step 507, the attached PE device sends a LMM to its MTU device to establish a bi-directional virtual circuit (VC) label switch path. In step 508, the attached PE device associates the incoming VC with a site-ID in a learning table. In step 509, a second VPLS site is added to the same MTU device, and the MTU device sends an LMM with the same label, but with an updated site-ID list to its attached PE device. In step 510, the PE updates the learning table by associating the second site-ID with the incoming VC.

In step 511, a VPLS site is deleted via an MTU device configuration command. A decision is made in step 512 as to whether this VPLS deletion is a final deletion from the MTU. If 'No,' then in step 513, a LMM with the same label, but an updated site-ID list is sent to the attached PE device. In step 514, the attached PE updates the learning table by deleting the site-ID entry for the VPLS site being deleted. The attached PE device then broadcasts the LMM with the updated site-ID list to a plurality of additional provider edge devices in step 515.

If the answer in step 512 is 'Yes,' then in step 516, a Label Withdraw Message is sent to the MTU's attached PE device to release the label, and in step 517, the attached PE device sends a Label Withdraw Message to the MTU to release the label in the opposite direction.

A final VPLS site to be deleted from the PE device determination is made in decision step 518. If the final deletion answer is 'Yes,' then a Label Withdraw Message is broadcast by the PE device in step 519 to a plurality of additional PE devices (peers). If the answer is 'No,' then in step 520, the PE device broadcasts the same LMM with an updated site-ID list to a plurality of additional PE devices. In step 521, the remote PE devices update their learning tables by deleting the site-ID entry for the VPLS site being deleted.

Figure 6:
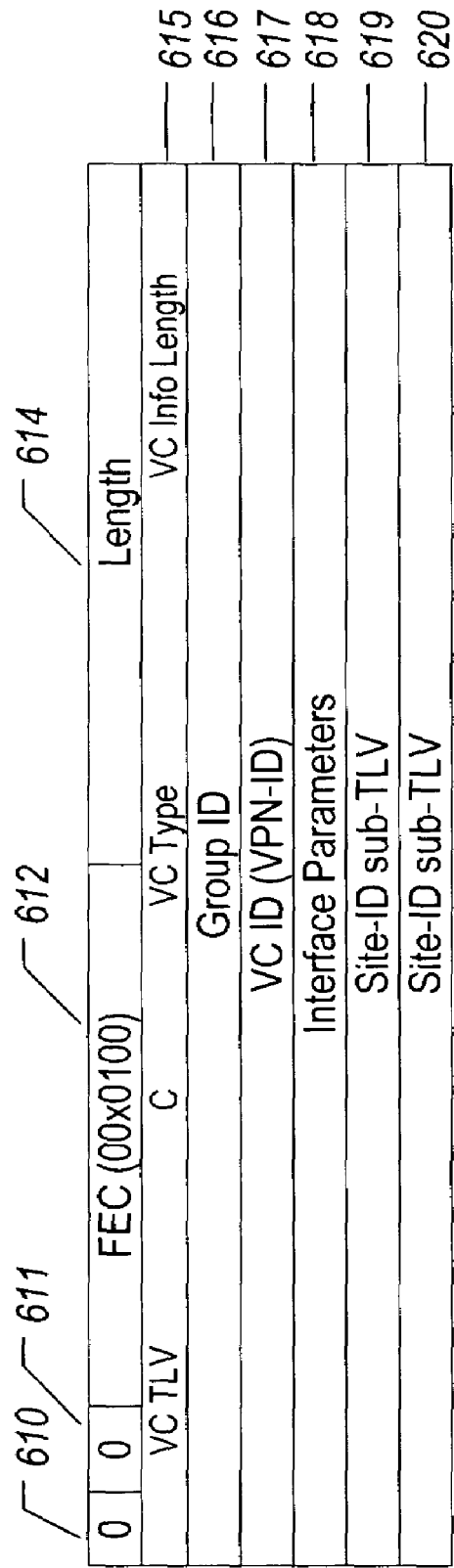
FIG. 6 is a block diagram illustrating a FEC (forwarding equivalence class) field to represent a MPLS virtual circuit for VPLS membership discovery between an MTU and its corresponding (provider edge) PE, as well as between local PE and remote PEs.

FIG. 6 is a general diagram illustrating an example of a virtual circuit field equivalence class (VC-FEC) packet of the present invention. This type of packet may be communicated by the LMM as discussed in the various embodiments presented herein. The VC-FEC comprises an unknown bit 610 and a forward bit 611, a FEC TLV type 612, and length information 614. Field 615 identifies a virtual circuit (VC) encapsulation type, e.g., frame relay, Ethernet, VLAN, ATM VCC transport, while field 616 identifies a group identification (ID) element. The 32-bit Group ID 616 represents a group of VCs if there is no VC ID present. Another field 617 identifies a virtual circuit (VC) connection identification (ID). An interface parameter field 618 defines a multi tenant unit device parameter. Sub-tag length value fields 619, 620 are used to specify a particular site identifier (site-ID) associated with origination of the VC-FEC packet. A site identifier could identify the provider's media access control (MAC).

Figure 7:
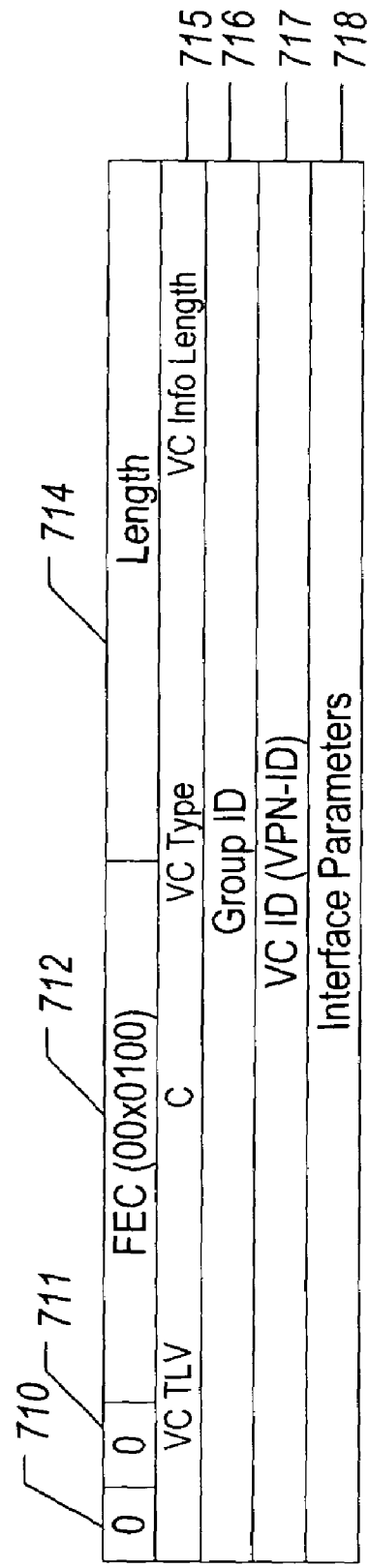
FIG. 7 is a block diagram illustrating a prior art FEC field to represent a MPLS virtual circuit utilized for VPLS membership discovery between an MTU and its corresponding PE device, as well as between local and remote PEs.

FIG. 7 is a general diagram illustrating another example of a VC-FEC packet. Complete specifications for the VC-FEC packet of FIG. 7 are contained in the Internet Engineering Task Force (IETF) LDP Specification (RFC 3036). The VC-FEC packet of FIG. 7 is utilized in embodiments of the methods disclosed herein. For example, the various label mapping messages (LMMs) may communicate the packet of FIG. 7, or may communicate the VC-FEC packet of FIG. 6. Which packet is utilized depends upon whether address learning is to be accomplished in the data plane, e.g. address learning conducted with packet forwarding (packet of FIG. 7), or whether the auto discovery and address learning processes are performed together (packet of FIG. 6).

The VC-FEC of FIG. 7 comprises an unknown bit 710 and a forward bit 711, a FEC TLV type 712, and length information 714. Field 715 identifies a virtual circuit (VC) encapsulation type, e.g., frame relay, Ethernet, VLAN, ATM VCC transport, while field 716 identifies a group identification (ID) element. The 32-bit Group ID 716 represents a group of VCs if there is no VC ID present. Another field 717 identifies a virtual circuit (VC) connection identification (ID). Field 718 defines interface parameters for multi tenant unit devices.

The embodiments discussed with reference to FIGS. 6 and 7 of VC-FEC packets are utilized within a multi-protocol label switching (MPLS) system comprising a first computing node and a second computing node coupled to the first computing node. The second computing node receives and stores a VC-FEC packet for use in automatic membership discovery.

The above disclosed subject matter is to be considered illustrative, and not restrictive and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for automating membership discovery in a distributed computer network, the method comprising:

establishing a first virtual circuit label switch path between a first multi tenant unit device and a provider edge device attached to said first multi tenant unit device, wherein the virtual circuit label switch path is associated with a first virtual private local area network (LAN) service site;

receiving a first label mapping message at the provider edge device;

sending a second label mapping message to the first multi tenant unit device;

broadcasting the first label mapping message to a plurality of additional provider edge devices;

adding a second virtual private LAN service site to the distributed computer network, wherein the second virtual private LAN service site is attached to the first multi tenant unit device; and broadcasting the second label mapping message to the plurality of additional provider edge devices, the second label mapping message having a virtual circuit label associated with the first virtual circuit label switch path and having a non-updated site identification list.

2. The method of claim 1, further comprising:
deleting a third virtual private LAN service site;
sending a third label withdraw message to release a virtual circuit label, wherein the third label withdraw message is associated with the third virtual private LAN service site; and
broadcasting the third label withdraw message to the plurality of additional provider edge devices.

3. The method of claim 2, further comprising:
sending a fourth label withdraw message to the multi tenant unit device to release the virtual circuit label.

4. A method for automating membership discovery in a distributed computer network, the method comprising:
establishing a first virtual circuit label switch path between a first multi tenant unit device and a provider edge device attached to said multi tenant unit device, wherein the virtual circuit label switch path is associated with a first virtual private local area network (LAN) service site;
receiving a first label mapping message at the provider edge device, the label mapping message communicated over the first virtual circuit label switch path;
sending a second label mapping message from the provider edge device associated with the first multi tenant unit;
broadcasting the first label mapping message to a plurality of additional provider edge devices;
adding a second virtual private LAN service site to the distributed computer network; and
broadcasting the second label mapping message to the plurality of additional provider edge devices, the second label mapping message having a virtual circuit label associated with the first virtual circuit label switch path and a site identification list.

5. The method of claim 4, wherein the first label mapping message has a common virtual circuit label with respect to the second label mapping message and wherein at least one of the label mapping messages has an updated site identification list.

6. The method of claim 4, further comprising:
associating the first virtual circuit label switch path with a site identification number in a learning table.

7. The method of claim 4, wherein the site identification list is an updated site identification list.

8. The method of claim 4, wherein the site identification list is a non-updated site identification list (when the second virtual private LAN service site is attached to the first multi tenant unit device).

9. The method of claim 4, further comprising:
deleting a third virtual private LAN service site;
sending a label mapping message having an updated site identification list and a virtual circuit label associated with the third virtual private LAN service site;
updating a learning table in response to receiving the updated side identification list; and
broadcasting the label mapping message having the updated site identification list to the plurality of additional provider edge devices.

10. The method of claim 9, further comprising sending a fourth label withdraw message to the multi tenant unit device to release the virtual circuit label.

11. The method of claim 4, wherein the label mapping message comprises:
a first field to identify a virtual circuit encapsulation type;
a second field to identify a group identification element;
a third field to identify a virtual circuit connection;
an interface parameter field to define a multi tenant unit device parameter; and
a sub-tag length value field specifying a particular site identifier associated with an origination site of the virtual circuit forwarding equivalence class packet.

12. A method of automating Virtual Private LAN Service membership discovery, the method comprising:
establishing a Multi-Protocol Label Switching (MPLS) tunnel and Targeted Label Distribution Protocol (LDP) signaling channel between a first Provider Edge (PE) device and a plurality of Provider Edge devices;
adding a first Virtual Private LAN Service (VPLS) site to a Multi-Tenant Unit (MTU) device associated with the first Provider Edge device;
sending a first Label Distribution Protocol Label Mapping Message to the first Provider Edge device from the Multi-Tenant Unit device;
broadcasting the first Label Distribution Protocol Label Mapping Message to the plurality of Provider Edge devices from the first Provider Edge device;
sending a second Label Distribution Protocol Label Mapping Message to the Multi-Tenant Unit device from the first Provider Edge device to establish a virtual circuit label switch path between the MTU device and the first PE device;
adding a second Virtual Private LAN Service site to the Multi-Tenant Unit Device without sending an associated Label Distribution Protocol Label Mapping Message to the first Provider Edge device
deleting a respective one VPLS site of the first VPLS site or the second VPLS site using a configuration command;
determining at the Multi-Tenant Unit device whether deleting the respective one VPLS site is a final deletion of the respective one VPLS site attached to the MTU device;
sending a first Label Withdraw Message to the first Provider Edge device based on the final deletion determination; and
sending a second Label Withdraw Message to the Multi-Tenant Unit device from the first Private Edge device based on sending the first Label Withdraw Message.

13. The method of claim 12, wherein when another VPLS site is being added to a second MTU associated with a remote PE device, the remote PE device broadcasts a LDP Label Mapping Message to the first PE device to establish a virtual circuit label switch path between the first PE device and the remote PE device.

14. The method of claim 12, wherein the first Provider Edge device performs address learning in regards to the virtual circuit label switch path between the MTU device and the PE device.

15. The method of claim 12, wherein the plurality Provider Edge devices performs address learning in regards to the virtual circuit label switch path between the first PE device and the remote PE device.

16. A method of automatic discovery of Virtual Private LAN Service sites, the method comprising:
establishing a Multi-Protocol Label Switching tunnel and a Label Distribution Protocol Label Switching tunnel and a Label Distribution Protocol signaling channel between a Provider Edge device and a remote Provider Edge device;

adding a first Virtual Provider LAN Service site to a Multi-Tenant Unit device associated with the Provider Edge device;

sending a first Label Distribution Protocol Label Mapping Message and a site identification list to the Provider Edge device from the Multi-Tenant Unit device;

broadcasting Label Distribution Protocol Label Mapping Message with the site identification list to the remote Provider Edge devices from a first Provider Edge device, to establish a virtual circuit label switch path;

associating the site identification list with the virtual circuit label switch path at the remote Provider Edge device;

sending a second Label Distribution Protocol Label Mapping Message from the Provider Edge device to the Multi-Tenant unit device, to establish a bi-directional virtual label switch path;

associating the site identification list with the bi-directional virtual label switch path at the Provider Edge device;

adding a second Virtual Private LAN service site to the Multi-Tenant Unit device;

sending a third Label Distribution Protocol Label Mapping Message and an updated site identification list to the Provider Edge device; and updating a learning table by associating the updated site identification list with the bi-directional virtual circuit label switch path at the Provider Edge device.

17. The method of claim 16, further comprising:

sending an updated Label Distribution Protocol Label Mapping Message associated with an updated site identification list to the Provider Edge device based on determining whether the Virtual Private LAN Service site being deleted is the final Virtual Provider Private LAN Service site.

18. The method of claim 16, further comprising:

determining whether the Virtual Private LAN Service is a final Virtual Provider LAN Service associated with the Provider Edge device; and broadcasting a second Label Withdraw Message to the remote Provider Edge device based on determining whether the first Virtual Private LAN Service is the final Virtual Provider LAN Service associated with the Provider Edge device.

19. The method of claim 18, further comprising:

broadcasting the Label Distribution Protocol Label Mapping Message with the updated site identification list to the remote Provider Edge device based on determining whether the first Virtual Provider LAN Service is the final Virtual Private LAN Service associated with the Provider Edge device.

* * * * *